United States Patent
Söderlund et al.

(10) Patent No.: US 10,243,863 B2
(45) Date of Patent: Mar. 26, 2019

(54) SERVICE SCALING IN COMMUNICATIONS

(71) Applicant: NOKIA SOLUTIONS AND NETWORKS OY, Espoo (FI)

(72) Inventors: Jani Olavi Söderlund, Vantaa (FI); Erkki Juhani Hietala, Espoo (FI); Sumanta Saha, Espoo (FI); Niko Markus Savolainen, Kerava (FI); Tommy Johannes Lindgren, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/114,479

(22) PCT Filed: Feb. 4, 2014

(86) PCT No.: PCT/EP2014/052074
§ 371 (c)(1),
(2) Date: Jul. 27, 2016

(87) PCT Pub. No.: WO2015/117636
PCT Pub. Date: Aug. 13, 2015

(65) Prior Publication Data
US 2016/0344640 A1 Nov. 24, 2016

(51) Int. Cl.
*H04L 12/851* (2013.01)
*H04L 12/26* (2006.01)
*H04L 29/06* (2006.01)

(52) U.S. Cl.
CPC ........ *H04L 47/2483* (2013.01); *H04L 43/028* (2013.01); *H04L 69/22* (2013.01)

(58) Field of Classification Search
CPC .................................................. H04L 47/2483
See application file for complete search history.

(56) References Cited

U.S. PATENT DOCUMENTS

| | | | |
|---|---|---|---|
| 2005/0033808 A1* | 2/2005 | Cheng | H04L 67/306 709/205 |
| 2007/0058632 A1* | 3/2007 | Back | H04L 43/00 370/392 |

(Continued)

FOREIGN PATENT DOCUMENTS

| | | |
|---|---|---|
| JP | 2008-524916 A | 7/2008 |
| JP | 2013-179456 A | 9/2013 |
| WO | WO 2013/008134 A2 | 1/2013 |

OTHER PUBLICATIONS

International Search Report and Written Opinion dated May 21, 2014 corresponding to International Patent Application No. PCT/EP2014/052074.

(Continued)

*Primary Examiner* — John D Blanton
(74) *Attorney, Agent, or Firm* — Squire Patton Boggs (US) LLP

(57) ABSTRACT

A method is disclosed for downscaling a deep packet inspection service in a network apparatus. The method comprises receiving data flow in a gateway virtual machine via a software defined networking switch, and keeping track of data flow and control flow and their state per subscriber. If needed, a new deep packet inspection virtual machine is selected for the data flow. The software defined networking switch is informed on the selection of the new deep packet inspection virtual machine. The new deep packet inspection virtual machine is instructed to re-create a flow identification for the data flow to ensure deep packet inspection service continuity.

10 Claims, 4 Drawing Sheets

(56) References Cited

U.S. PATENT DOCUMENTS

| | | | |
|---|---|---|---|
| 2010/0103837 A1 | 4/2010 | Jungck et al. | |
| 2011/0243024 A1* | 10/2011 | Osterling | H04L 67/104 370/252 |
| 2015/0020164 A1* | 1/2015 | Tankov | H04L 63/08 726/4 |
| 2015/0156086 A1* | 6/2015 | Chesla | H04L 43/04 709/224 |
| 2016/0248577 A1* | 8/2016 | Ilyas | H04L 7/02 |

OTHER PUBLICATIONS

P. Quinn et al., "Network Service Header, draft-quinn-nsh-00.txt," Network Working Group, Jun. 13, 2013, pp. 1-20.
Notification of Reasons for Rejection dated Aug. 21, 2017 corresponding to Japanese Patent Application No. 2016-550225.
Hisashi Kojima et al., "Service chaining methods for network function virtualization on carrier networks," IEICE (The Institute of Electronics, Information and Communication Engineers) Technical Report, Sep. 5, 2013, vol. 113, No. 205, pp. 13-18.

\* cited by examiner

SERVICE SCALING IN COMMUNICATIONS

FIELD OF THE INVENTION

The exemplary and non-limiting embodiments of this invention relate generally to wireless communications networks, and more particularly to network functions virtualization.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Network functions virtualization (NFV) is a design approach for building complex applications e.g. in the telecommunications and service provider industries. NFV virtualizes network functions into building blocks that may be connected, i.e. chained together to create services. A virtualized network function (VNF), may comprise one or more virtual machines (VM) running various software and processes. The same virtualized platform that supports provisioning machines into VNFs, may also support programming virtualized network devices and flows to support VNFs. The programming of virtualized network devices and flows to support VNFs is the domain of software defined networking (SDN).

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, and a computer program product as defined in the independent claims. Further embodiments of the invention are disclosed in the dependent claims.

An aspect of the invention relates to a method for downscaling a deep packet inspection service in a network apparatus, the method comprising receiving data flow in a gateway virtual machine via a software defined networking switch; keeping track of data flow and control flow and their state per subscriber; selecting, if needed, a new deep packet inspection virtual machine for the data flow; informing the software defined networking switch on the selection of the new deep packet inspection virtual machine; and instructing the new deep packet inspection virtual machine to re-create a flow identification for the data flow to ensure deep packet inspection service continuity.

A further aspect of the invention relates to an apparatus comprising at least one processor; and at least one memory including a computer program code, wherein the at least one memory and the computer program code are configured to, with the at least one processor, cause the apparatus to perform any of the method steps.

A still further aspect of the invention relates to an apparatus comprising at least one processor; and at least one memory including a computer program code, wherein the at least one memory and the computer program code are configured to, with the at least one processor, cause the apparatus to when receiving a data packet with a metadata header, re-create a data flow and a flow identification in its own database.

A still further aspect of the invention relates to a computer program product comprising executable code that when executed, causes execution of functions of the method.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Recent developments in mobile infrastructure technology have radically changed the view of the network from traditional silo-hardware based black box elements to more open generic-hardware based systems where logically separate network functions are also physically separate and connected with well-known interfaces. Such developments are also being standardized under the supervision of ETSI in the name of NFV (network functions virtualization).

Figure 1:
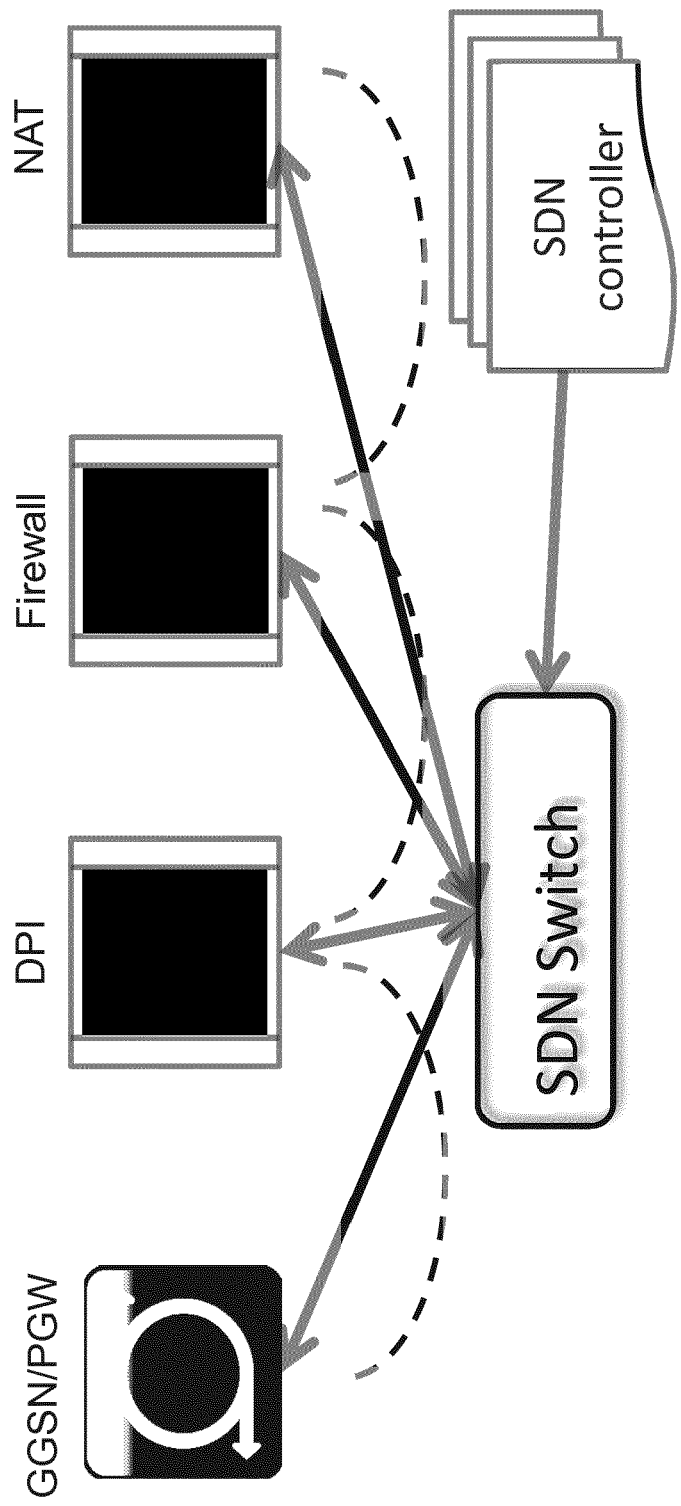
FIG. 1 illustrates prior art service chaining with software defined networking.

An important part of NFV is service chaining (see FIG. 1 illustrating prior art service chaining with software defined networking (SDN)) where necessary add-on services such as deep packet inspection (DPI), firewall, network address translation (NAT) etc. are chained together on demand for a particular bearer. In this way, there are no hardwired flows of network functions for a particular bearer; rather the flow is defined on the fly based on need coming from different AAA servers and operator configuration. For example, a particular traffic flow of a bearer may be charged differently if that flow is of a certain application (such as torrent etc.). This differential charging requires the use of DPI to detect an application type. This need then triggers the chaining of a DPI service to a bearer data flow, and each the user plane packet for this bearer goes through the DPI service in the service chain.

In a future vision of NFV, these services are realized using virtualization, and chaining virtual machines (VM) on demand to a packet path of user plane data. The packets flow from VM to VM receiving services as chained by central control and routed using technologies such as the software defined networking (SDN).

In contemporary mobile network deployments, the hardware is fully proprietary or semi-proprietary like ATCA (advanced telecommunications computing architecture) which is proprietary hardware based on standard architecture and interfaces. In these environments, capacity scaling is done in a very conservative manner. In mobile network equipment, scaling up hardware is not usually an option, and scaling out is preferred. Given the raise in the mobile traffic ongoing currently and expected just to increase further, scaling down is usually not required, unless a service is being replaced gradually with something newer and more effective service. Scaling down is also useful as an energy-saving possibility, e.g. during night time or holiday seasons.

There are anyway services in the network that are not fully dependent on total network capacity requirements but rather operator use cases and business models. Besides a basic bit-pipe operation, mobile gateways like GGSN or P-GW include additional services, either directly integrated to these elements or as a bump-in-a-wire kind of service before or after the gateway.

As an example of such a service, the need for DPI may vary depending on the time of a day (business users active on daytime not requiring DPI service for their corporate subscriptions, but residential users in off-business hours need full DPI service for differentiated charging and ensuring subscribed QoS/QoE), or time-limited operator campaigns like "Facebook service free of charge during evenings".

DPI as a service is quite challenging, given the fact that it is very resource (CPU, memory) consuming, and that it is a fully state-aware service, analyzing and tracking traffic on a flow, not subscriber or session level. A functional solution requires persistency of getting each packet of the flow every time to the same DPI VM. Moreover, many applications use multiple concurrent flows for data and sometimes a separate control flow—each of which need to be handled by the same DPI VM in order to be able to identify the application. The data flows often do not have any specific characteristics that would allow identification without the control flow information.

The scaling issues are general issues applicable for any services possibly realized with NFV approach in the future networks, but deep packet inspection (DPI) service is used herein as an example.

For scaling out, GW VMs (or any source located before a DPI function in the network) are aware of presence and availability of the DPI VMs. The selection method is not merely a simple hash out of each available DPI VM, since the GW VM needs to send packets belonging to one flow to the same VM instance (an additional functionality takes the load of individual DPI VMs into account). This is achieved by a GW instance managing flow entries in an SDN switch using an Open Flow protocol, based on information received from a common cluster controller entity.

For scaling down, an additional complexity case comes from being able to continue an analysis for flows handled currently in the unit (VM) which is going to be shut down without losing track of the flow identification. Many flows last for hours (e.g. long file transfers, video streaming), making it impractical just to wait until each existing flow has been removed by the service using them. For some protocols the identification may be impossible after an initial signalling phase has passed. For these, scaling service down statelessly might even lead to free data for the end users (not possible to charge anymore since the service identification has been lost), not being able to ensure proper QoS for the service that the user has prioritized, or losing a traffic redirection capability (e.g. to the operator's service network). This approach is not acceptable to the mobile operators, whereas the issue is not in focus of fixed operators and overall data center kind of deployments.

Besides scaling up/out, there needs to be a way to enable elastic scaling down of the DPI service in a cloud environment, which is not possible without additional intelligence introduced to the overall solution. As described above, abruptly shutting down the DPI service leads to an unacceptable situation for the services flowing through that service instance.

Automatic scaling is an important issue in virtualization/cloud concept, allowing resources to be allocated and consumed based on need, not needing investments based on highest needs. In real life, this is currently being rolled out in the data centers, with often stateless applications.

The DPI service may be handled in dedicated hardware (blades) with no stateful redundancy with each other (full data synchronization is practically not possible due to the data rates). If there is a need to add a new DPI blade, it may be done during runtime, so that the service blades get to know about the presence of the new blade and include it in the load distribution scheme. Scaling down (due to hw/sw failure, maintenance) may be done in a limited fashion, meaning that the data available only in the affected DPI blades is lost. There may be an internal mechanism to help the DPI blades to re-create some of the lost flows, by having the flow databases also on the other GW blades which use the DPI blades in an M:N configuration (one GW blade uses services of multiple DPI blades, and vice versa). As the capacity of one VM is bound to be less than the current dedicated DPI blades, it is foreseen that both M and N are bigger in the cloud environment.

Regarding the issues for the GW VMs knowing the load of the DPI VMs needed in a scale out solution, the load level of DPI VMs needs to be in general known by GW VMs in order to do active load balancing.

An exemplary embodiment discloses lossless downscaling of a DPI service in an SDN switched NFV environment. An exemplary embodiment enables fully automated and lossless DPI service scale down as required by elasticity needs of mobile gateway cloud deployments.

An exemplary embodiment comprises keeping track of each flow and its state per subscriber in the gateway (GW) VMs. An exemplary embodiment further comprises selecting with some (implementation specific) algorithm a new DPI VM instance for the flow and programming the SDN switch accordingly. In an exemplary embodiment, to ensure service continuity the new DPI VM instance is helped to re-create the flow identification.

In an exemplary embodiment, a data packet forwarded from GW VM to DPI VM in this case includes information regarding a current service identification (if it was available) as additional metadata. This metadata may be included in various ways like proprietary header extensions, additional tunnel headers, or with (proposed) standard metadata like network service headers (NSH).

In an exemplary embodiment, for scaling down, when a common cluster controller (CC), by monitoring resource usage levels of the DPI VMs decides to shut down DPI VM, the common cluster controller sends this information (i.e. information about existence of the other VMs) to each GW instance (GW VMs need to know if DPI VMs are added or removed to be able to direct the requests to particular DPI VMs). Having no direct relation between VMs but rather just conveying information about existence of the other VMs allows the implementation to be very generic.

Figure 2:
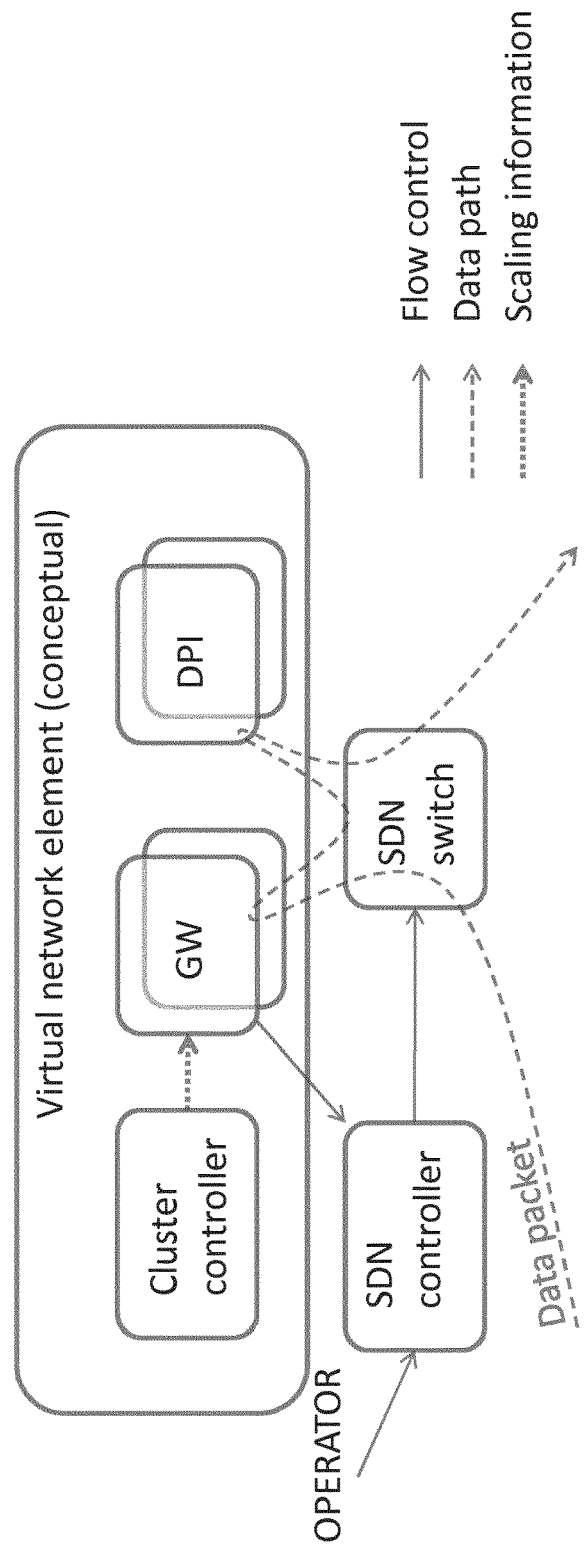
FIG. 2 illustrates packet and control paths and scaling information flow according to an exemplary embodiment.

FIG. 2 illustrates packet and control paths and scaling information flow according to an exemplary embodiment.

The first reaction in GW VMs includes selecting a new DPI VM for affected flows and programming the SDN switch(es) accordingly via an SDN controller. Upon reception of a data packet of one of these affected flows, GW VM creates a metadata header including earlier service identification, and attaches this metadata to the original data packet. The metadata in the needed for re-creating the flow in the receiving DPI VM relies on each end having the same view on the application identification.

When receiving the packet with this metadata header the new DPI VM re-creates the flow in its own database by trusting the earlier analysis result (this acceptance may be subject to a validation mechanism), and strips off the metadata header before starting to analyze the original packet and forwarding it further.

The DPI service retains full control and authority on the identification. For example, for persistent HTTP sessions it is possible that the service used (domain name) changes during the flow, and then the initial analysis result is overridden by the new service identification.

DPI may be utilized for differential charging and other subscriber-specific value-add services. An exemplary embodiment allows hitless service continuation even when going towards aggressive power saving schemes.

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support service chaining with SDN. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE-A network elements, without restricting the embodiment to such an architecture, however. The embodiments described in these examples are not limited to the LTE-A systems but can also be implemented in other network systems, such as UMTS (universal mobile telecommunications system), LTE, LTE-A, GSM, EDGE, WCDMA, bluetooth network, WLAN or other fixed, mobile or wireless network. In an embodiment, the presented solution may be applied between elements belonging to different but compatible systems such as LAN, WLAN, LTE, LTE-A and UMTS.

Figure 3:
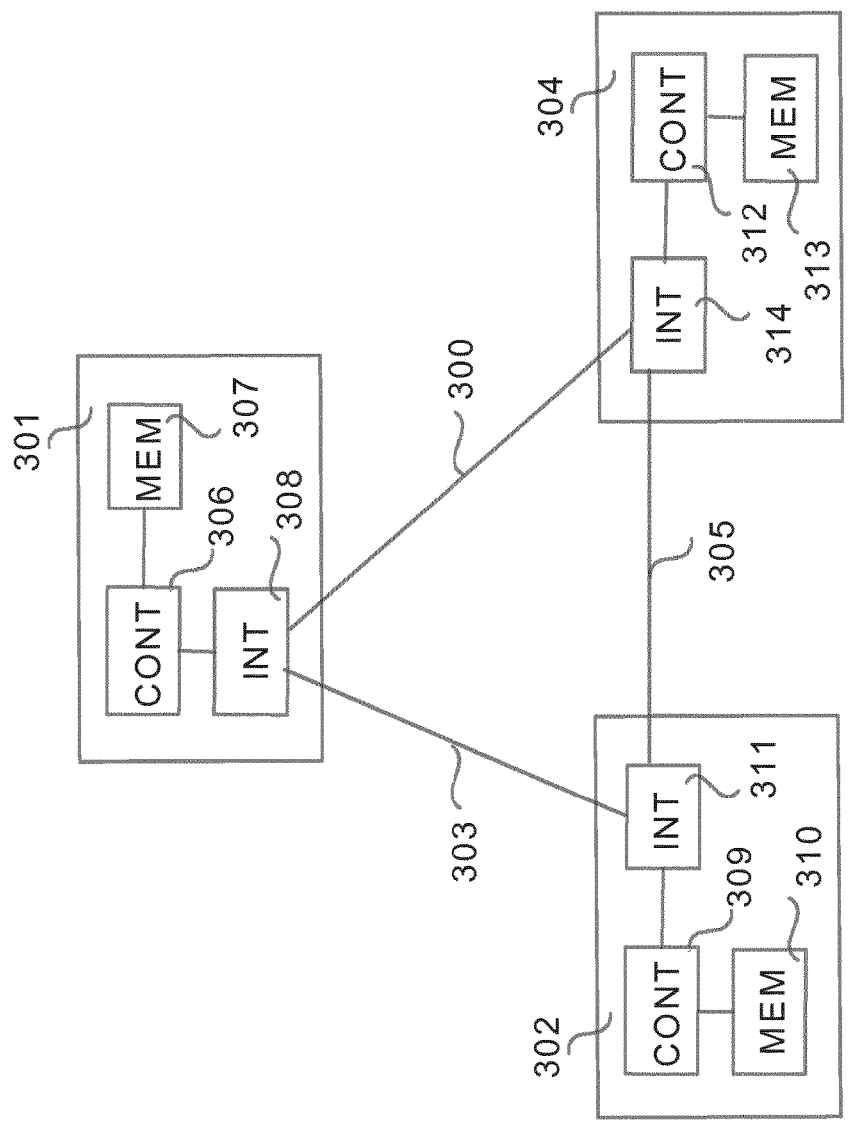
FIG. 3 shows a simplified block diagram illustrating exemplary apparatuses.

A general architecture of a communication system is illustrated in FIG. 3. FIG. 3 is a simplified system architecture only showing some elements and functional entities, all being logical units whose implementation may differ from what is shown. The connections shown in FIG. 3 are logical connections; the actual physical connections may be different. It is apparent to a person skilled in the art that the systems also comprise other functions and structures. It should be appreciated that the functions, structures, elements and the protocols used in or for service chaining, are irrelevant to the actual invention. Therefore, they need not to be discussed in more detail here.

The exemplary network system of FIG. 3 comprises a network element or node 301 of a network service provider. The network element 301 may include e.g. an SDN controller SC, or any other network element, or a combination of network elements, or a component/subset of a network element. The network node 301 may be connected to one or more core network (CN) elements (not shown in FIG. 3) such as a mobile switching centre (MSC), MSC server (MSS), serving gateway (SGW), mobility management entity (MME), gateway GPRS support node (GGSN), serving GPRS support node (SGSN), home location register (HLR), home subscriber server (HSS), visitor location register (VLR), network management system (NMS), a related mediator element, or to one or more radio network elements (not shown in FIG. 3) such as a base station (of e.g. LTE/LTE-A, 3G/HPSA, 2G or WLAN), to a radio network controller (e.g. 3G RNC, 2G BSC, or WLAN controller), or to a combination of network elements. FIG. 3 shows one or more virtual network elements 302 connected to the SDN controller 301 via a connection 303. In FIG. 3, the virtual network element 302 which may comprise e.g. a cluster controller CC, gateway virtual machine GW VM, and/or a deep packet inspection virtual machine DPI VM. FIG. 3 shows an SDN switch 304 configured to be in connection 300, 305 with the SDN controller 301 and the virtual network element 302, respectively.

The SDN controller 301 comprises a controller 306 operationally connected to a memory 307. The controller 306 controls the operation of the SDN controller 301. The memory 307 is configured to store software and data. The SDN controller 301 may comprise a transceiver (not shown). The transceiver may be configured to set up and maintain a wireless connection (not shown) to a user equipment (UE). The transceiver may be operationally connected to an antenna arrangement (not shown). The antenna arrangement may comprise a set of antennas. The number of antennas may be two to four, for example. The number of antennas is not limited to any particular number. The SDN controller 301 may be operationally connected (directly or indirectly) to another network element or to another component/subset of a network element of the communication system, such as the virtual network element 302 or the SDN switch 304, via an interface 308.

The virtual network element 302 comprises a controller 309 operationally connected to a memory 310. The controller 309 controls the operation of the virtual network element 302. The memory 310 is configured to store software and data. The virtual network element 302 may comprise a transceiver (not shown). The transceiver may be configured to set up and maintain a wireless connection (not shown) to a user equipment (UE). The transceiver may be operationally connected to an antenna arrangement (not shown). The antenna arrangement may comprise a set of antennas. The number of antennas may be two to four, for example. The number of antennas is not limited to any particular number. The virtual network element 302 may be operationally connected (directly or indirectly) to another network element or to another component/subset of a network element of the communication system, such as the SDN controller 301 or the SDN switch 304, via an interface 311.

The SDN switch 304 comprises a controller 312 operationally connected to a memory 313. The controller 312 controls the operation of the SDN switch 304. The memory 313 is configured to store software and data. The SDN switch 304 may comprise a transceiver (not shown). The transceiver may be configured to set up and maintain a wireless connection (not shown) to a user equipment (UE). The transceiver may be operationally connected to an antenna arrangement (not shown). The antenna arrangement may comprise a set of antennas. The number of antennas may be two to four, for example. The number of antennas is not limited to any particular number. The SDN switch 304 may be operationally connected (directly or indirectly) to another network element or to another component/subset of a network element of the communication system, such as the SDN controller 301 or the virtual network element 302, via an interface 314.

The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 301, 302, 304 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 301, 302, 304 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 307, 310, 313 may include volatile and/or non-volatile memory and typically stores content, data, or the like. For example, the memory 307, 310, 313 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 4:
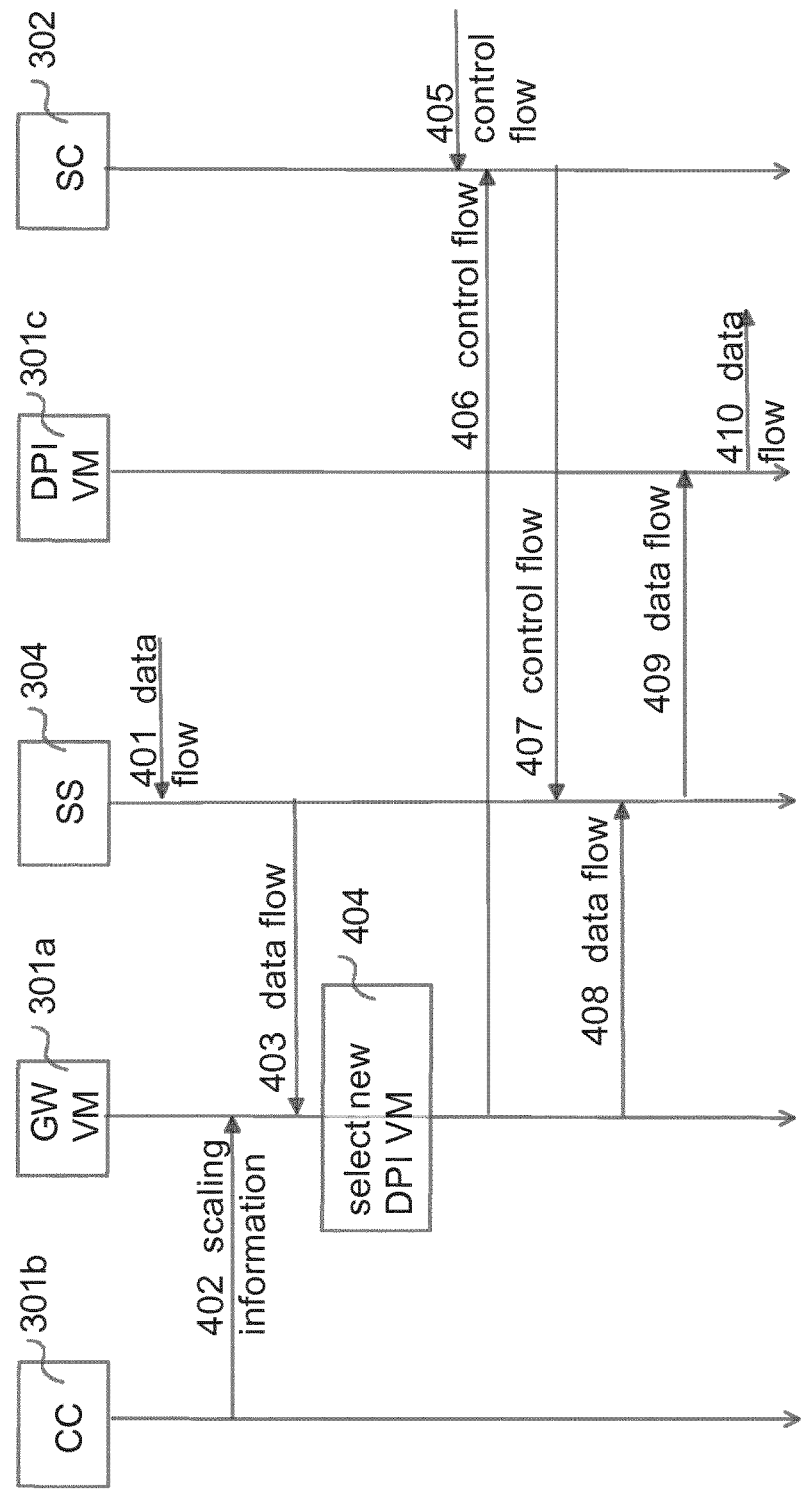
FIG. 4 shows a messaging diagram illustrating an exemplary messaging event according to an embodiment of the invention.

The signalling chart of FIG. 4 illustrates the required signalling. In the example of FIG. 4, in a SDN switch a data flow 401 including at least one data packet is received and forwarded 403 to a gateway virtual machine 301*a* of a virtual network element 301. In item 402, scaling information is transmitted from a cluster controller 302*b* of the virtual network element 301 to the gateway virtual machine 301*a*, the information including information on the cluster controller's decision to shut down a deep packet inspection virtual machine, wherein the decision is based e.g. on monitoring resource usage levels of the deep packet inspection virtual machine. In item 404, based on the scaling information received from the cluster controller 302*b*, a new deep packet inspection virtual machine 301*c* of the virtual network element 301 is selected in the gateway virtual machine 301*a* for the data flow. In item 404, based on the selection 404, the gateway virtual machine 301*a* informs 406, 407, via an SDN controller 302, the SDN switch 304 on the selection of the new deep packet inspection virtual machine 301*c* of the virtual network element 301. The network operator may also provide control flow/scaling information 405 to the SDN controller 302, and/or to the SDN switch 304 via the SDN controller 302. In item 408, 409, the gateway virtual machine 301*a* instructs the new deep packet inspection virtual machine 301*c* to re-create a flow identification for the data flow to ensure deep packet inspection service continuity. This is done by including corresponding metadata in a proprietary header extension, additional tunnel header, or as standard metadata such as a network service header, of a data packet transmitted from the gateway virtual machine 301*a* via the SDN switch 304 to the new deep packet inspection virtual machine 301*c*. In item 410, data flow/a data packet from which the metadata has been stripped is forwarded from the new deep packet inspection virtual machine 301*c*.

The steps/points, signalling messages and related functions de-scribed above in FIGS. 1 to 4 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

DPI deep packet inspection
GW gateway
NFV network function virtualization
NSH network service header
SDN software defined networking
VM virtual machine
AAA authentication, authorization, and accounting

The invention claimed is:

1. A method for downscaling a deep packet inspection service in a network apparatus, the method comprising:
   receiving data flow in a gateway virtual machine of a virtual network element via a software defined networking switch;
   keeping track of data flow and control flow and their state per subscriber;
   transmitting, from a cluster controller of the virtual network element, scaling information to the gateway virtual machine, the scaling information including information on the cluster controller's decision to shut down a deep packet inspection virtual machine;
   selecting, based on the cluster controller's decision, a new deep packet inspection virtual machine for the data flow;
   informing the software defined networking switch on the selection of the new deep packet inspection virtual machine;
   instructing the new deep packet inspection virtual machine to re-create a flow identification for the data flow to ensure deep packet inspection service continuity; and
   forwarding a data packet to the new deep packet inspection virtual machine, wherein a metadata header is stripped off in the new deep packet inspection virtual machine before the data packet is analysed in the new deep packet inspection virtual machine and forwarded to the software defined networking switch,
   wherein the metadata header includes earlier service identification of the data flow, and
   wherein the metadata header triggers the new deep packet inspection virtual machine to re-create a new data flow based on the metadata header to ensure deep packet inspection service continuity.

2. A method according to claim 1, wherein the data packet forwarded from the gateway virtual machine to the deep packet inspection virtual machine includes information regarding current service identification as additional metadata.

3. A method according to claim 2, wherein said metadata is included in a proprietary header extension, additional tunnel header, or as standard metadata such as a network service header.

4. A method according to claim 1, wherein the new deep packet inspection virtual machine is selected by means of a specific algorithm.

5. A method as claimed in claim 1, wherein
   the new deep packet inspection virtual machine for the data flow is selected based on receiving the cluster controller's decision to shut down a deep packet inspection virtual machine, the decision being based on monitoring resource usage levels of the deep packet inspection virtual machine.

6. A method as claimed in claim 1, further comprising informing the software defined networking switch on the selection of the new deep packet inspection virtual machine via a software defined networking controller.

7. A method as claimed in claim 1, wherein the data packet is forwarded to the new deep packet inspection virtual machine via the software defined networking switch.

8. An apparatus comprising at least one processor; and at least one memory including a computer program code, wherein the at least one memory and the computer program code are configured to, with the at least one processor, cause the apparatus to perform any of the method steps of claim 1.

9. An apparatus comprising:
   at least one processor; and
   at least one memory including a computer program code,
   wherein the at least one memory and the computer program code are configured to, with the at least one processor, cause the apparatus to:
   receive a data packet which includes a metadata header, wherein the metadata header includes earlier service identification of a data flow;
   when receiving the data packet with the metadata header, re-create a new data flow and a flow identification in an own database of the apparatus;
   strip off the metadata header before the data packet is analysed; and
   forward the data packet to a software defined networking switch.

10. A computer program product embodied on a non-transitory computer-readable medium, said product comprising executable code that when executed, causes execution of functions of a method according to claim 1.

* * * * *